(12) United States Patent
Pan et al.

(10) Patent No.: US 8,172,719 B2
(45) Date of Patent: May 8, 2012

(54) CONTINUOUSLY VARIABLE SPEED-CHANGING TRANSMISSION MECHANISM OF SHEET LAMINATING APPARATUS

(75) Inventors: Yung-Tai Pan, Taipei (TW); Chang-Qi Wu, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 519 days.

(21) Appl. No.: 12/464,015

(22) Filed: May 11, 2009

(65) Prior Publication Data

US 2010/0204003 A1 Aug. 12, 2010

(30) Foreign Application Priority Data

Feb. 6, 2009 (TW) .............................. 98103829 A

(51) Int. Cl.
*F16H 13/10* (2006.01)

(52) U.S. Cl. ................................ 476/45; 476/44; 476/37
(58) Field of Classification Search .................... 476/37, 476/44, 45
See application file for complete search history.

(56) References Cited

U.S. PATENT DOCUMENTS

| | | | | |
|---|---|---|---|---|
| 2,619,841 A * | 12/1952 | Von Kreudenstein | ............ | 476/2 |
| 2,907,220 A * | 10/1959 | Weisel | .............. | 476/43 |
| 3,173,312 A * | 3/1965 | Stockton | .......... | 476/10 |
| 3,302,474 A * | 2/1967 | Edlich | ............ | 475/216 |

* cited by examiner

*Primary Examiner* — David M Fenstermacher
(74) *Attorney, Agent, or Firm* — Kirton McConkie; Evan R. Witt

(57) ABSTRACT

A continuously variable speed-changing transmission mechanism of a sheet laminating apparatus includes a control module, a speed changing module, a speed reducing module and a hot press roller module. The continuously variable speed-changing transmission mechanism can laminate a sheet article at a stepless variable speed.

30 Claims, 7 Drawing Sheets

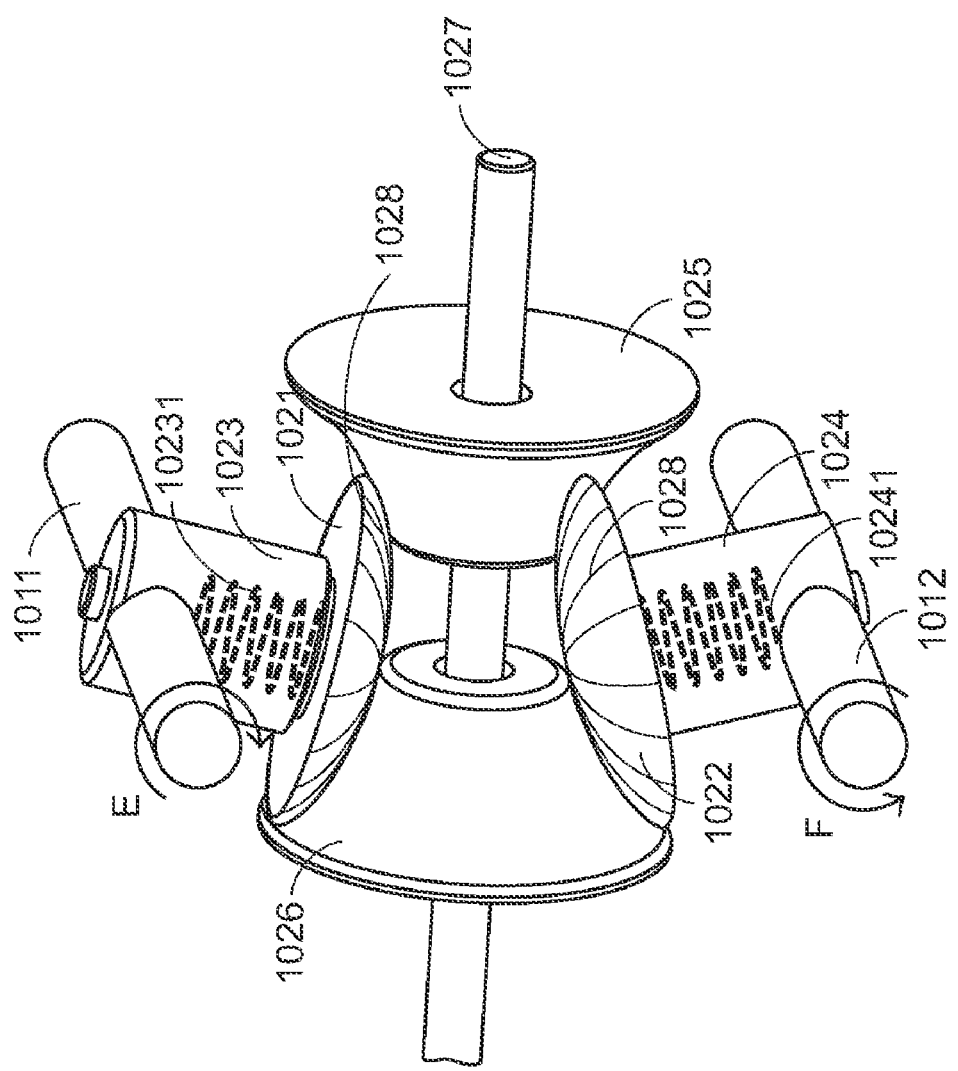

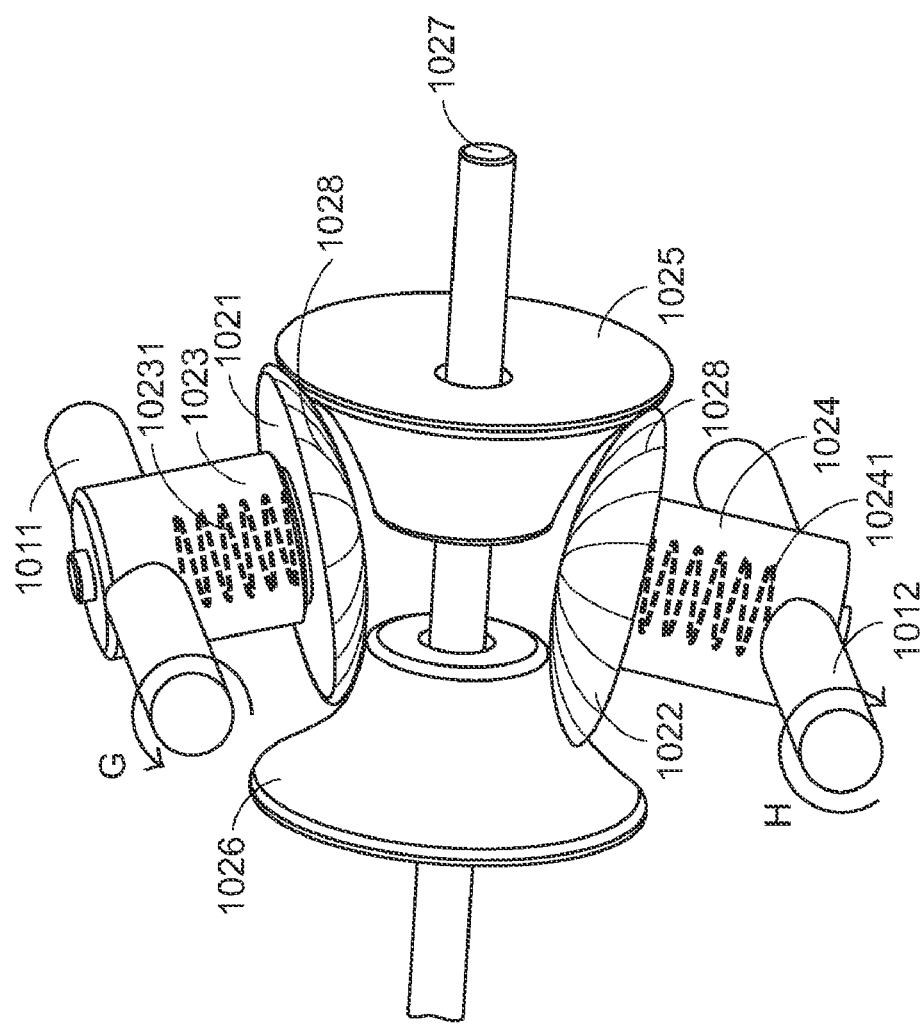

CONTINUOUSLY VARIABLE SPEED-CHANGING TRANSMISSION MECHANISM OF SHEET LAMINATING APPARATUS

FIELD OF THE INVENTION

The present invention relates to a sheet laminating apparatus, and more particularly to a sheet laminating apparatus for laminating a sheet article between two pieces of thermoplastic films.

BACKGROUND OF THE INVENTION

Conventionally, a document such as a sheet article is usually covered with a protective film for protection because such a sheet article is readily suffered from damage. Typically, a sheet laminating apparatus is used for laminating a sheet article between two pieces of protective films in order to achieve the protective purpose.

For enhancing the laminating efficacy, the sheet laminating apparatus needs to be adjusted at a proper hot press temperature according to the thickness of the document to be laminated. In other words, a heating time period or a cooling time period is required to increase or decrease the working temperature of the sheet laminating apparatus. For example, if the working temperature of the sheet laminating apparatus is increased for laminating a thicker document, a heating time period is required. Whereas, for laminating a thinner document, a cooling time period is required to decrease the working temperature. The procedure of adjusting the working temperature of the sheet laminating apparatus is very troublesome and time-consuming.

For solving the above drawbacks, a variable-speed sheet laminating apparatus was developed. The variable-speed sheet laminating apparatus is operated at a constant working temperature but at variable hot press speeds in order to laminate documents of various thicknesses. For laminating a thinner document, the sheet laminating apparatus is operated at a faster hot press speed by adjusting a control button. Whereas, for laminating a thicker document, the hot press speed of the sheet laminating apparatus is operated at a slower hot press speed by adjusting the control button. Since an electrical controller is used to adjust the hot press speed, the conventional variable-speed sheet laminating apparatus is not cost-effective.

SUMMARY OF THE INVENTION

It is an object of the present invention to provide a sheet laminating apparatus that is operated at variable hot press speeds.

Another object of the present invention provides a continuously variable speed-changing transmission mechanism of a sheet laminating apparatus.

In accordance with an aspect of the present invention, there is provided a continuously variable speed-changing transmission mechanism of a sheet laminating apparatus for driving rotation of a hot press roller module of the sheet laminating apparatus at a variable rotating speed. The continuously variable speed-changing transmission mechanism includes a speed changing module, a control module, a motor and a speed reducing module. The speed changing module includes a friction wheel, a power input transmission wheel and a power output transmission wheel. A first end of a rod set is connected to a middle portion of the friction wheel such that the friction wheel is vertically connected to the rod set. The power input transmission wheel and the power output transmission wheel are sheathed around a power transmission shaft and spaced from each other. The power input transmission wheel is fixedly connected to the power transmission shaft. The power output transmission wheel is pivotally connected to the power transmission shaft. The power input transmission wheel and the power output transmission wheel are conical wheels having respective smaller-area top circular surfaces and respective larger-area bottom circular surfaces. The top circular surfaces of the power input transmission wheel and the power output transmission wheel face to each other such that both sides of the friction wheel are simultaneously sustained against conical sidewalls of the conical wheels. The control module has a controlling source and is connected to the rod set for driving the rod set and swinging the friction wheel along an arc-shaped trajectory. A contact area between the friction wheel and the power input transmission wheel and the power output transmission wheel is changeable by adjusting a swing angle of the friction wheel. A motor is connected to the power transmission shaft for driving the power transmission shaft. Due to a friction force between the friction wheel and the power input transmission wheel that is fixedly connected to the power transmission shaft, the friction wheel is synchronously rotated with the power input transmission wheel. Due to a friction force between the friction wheel and the power output transmission wheel that is pivotally connected to the power transmission shaft, the power output transmission wheel is synchronously rotated with the friction wheel. The speed reducing module having both ends respectively connected to the hot press roller module and the power output transmission wheel, so that the hot press roller module is rotated at a rotating speed lower than the power output transmission wheel.

In an embodiment, the friction wheel is made of plastic material and having friction strips.

In an embodiment, an elastomeric element is disposed within the rod set for providing a normal force on the friction wheel, so that the friction wheel is elastically sustained against the conical sidewalls of the conical wheels.

Preferably, the power input transmission wheel and the power output transmission wheel are made of soft rubbery material.

In an embodiment, the power output transmission wheel and the power input transmission wheel are rotated in opposite directions. The power input transmission wheel and the power output transmission wheel are rotated at the same rotating speed if the contact area between the friction wheel and the power input transmission wheel is equal to the contact area between the friction wheel and the power output transmission wheel. The power input transmission wheel and the power output transmission wheel are rotated at different rotating speeds if the contact area between the friction wheel and the power input transmission wheel is different from the contact area between the friction wheel and the power output transmission wheel.

In an embodiment, the speed changing module further includes a second friction wheel. A first end of a second rod set is connected to a middle portion of the second friction wheel such that the second friction wheel is vertically connected to the second rod set. Both sides of the second friction wheel are simultaneously sustained against conical sidewalls of the conical wheels such that the second friction wheel is swung along a second arc-shaped trajectory.

Preferably, the second friction wheel is made of plastic material and having friction strips.

In an embodiment, a second elastomeric element is disposed within the second rod set for providing a normal force on the second friction wheel, so that the second friction wheel is elastically sustained against the conical sidewalls of the conical wheels.

In an embodiment, the control module further includes a control shaft. A first end of the control shaft is connected to a second end of the rod set such that the control shaft is vertically connected to the rod set. When the control shaft is driven by the controlling source, the friction wheel is swung along the arc-shaped trajectory with an axle center of the control shaft serving as a center point and the length of the rod set serving as a radius.

In an embodiment, the control module further includes a sector element, an arc-shaped recess and a shift lever. The sector element has a sectorial center. The sectorial center is connected a second end of the control shaft such that the sector element is vertically connected to the control shaft. The arc-shaped recess is formed in the sector element and has a ratchet structure on an inner wall thereof. The shift lever has a first end connected to the controlling source. A connecting ratchet is formed on a second end of the shift lever and engaged with the ratchet structure of the arc-shaped recess. When the shift lever is driven by the controlling source, the ratchet structure is driven by the connecting ratchet, so that the sector element is swung along the arc-shaped trajectory with respect to the axle center of the control shaft and the control shaft is synchronously rotated along the arc-shaped trajectory.

In an embodiment, the control module further includes a second control shaft and a second sector element. A first end of the second control shaft is connected to a second end of the second rod set such that the second control shaft is vertically connected to the second rod set. The second sector element has a second sectorial center. The second sectorial center is connected a second end of the second control shaft such that the second sector element is vertically connected to the second control shaft. The arc-shaped edges of the sector element and the second sector element have teeth structures engaged with each other, so that the sector element is swung along a second arc-shaped trajectory with respect to an axle center of the second control shaft, and the second friction wheel is swung along the second arc-shaped trajectory with the axle center of the second control shaft serving as a center point and the length of the second rod set serving as a radius.

In an embodiment, the control module further includes a plate-type frame having a receptacle for accommodating the sector element swung along the arc-shaped trajectory and the second sector element swung along the second arc-shaped trajectory.

In an embodiment, the speed reducing module includes a power output gear, a hot press gear and a combining gear set. The power output gear is connected to the bottom circular surface of the power output transmission wheel. The hot press gear is connected to the hot press roller module. The tooth number of the hot press gear is greater than the tooth number of the power output gear. The combining gear set includes a first-layered gear and a second-layered gear, which are synchronously rotated. The tooth number of the first-layered gear is greater than the tooth number of the second-layered gear. The power output gear is engaged with the first-layered gear, and the second-layered gear is engaged with the hot press gear. When the first-layered gear is driven by the power output gear to rotate, the second-layered gear and the hot press gear are synchronously rotated.

In an embodiment, the first-layered gear and the second-layered gear of the combining gear set are integrally formed.

In an embodiment, the hot press roller module includes a first hot press roller, a first hot press transmission shaft, a first transmission gear, a second hot press roller, a second hot press transmission shaft and a second transmission gear. The first hot press roller has a first end connected to the connected to the hot press gear. The first hot press transmission shaft sheathed by the hot press gear and the first hot press roller such that the first hot press transmission shaft is synchronously rotated with the hot press gear. The first transmission gear is connected to a second end of the first hot press roller. The first hot press transmission shaft is sheathed by the first transmission gear such that the first transmission gear is synchronously rotated with the first hot press transmission shaft. The second hot press roller is parallel with the first hot press roller. The second hot press transmission shaft is sheathed by the second hot press roller. The second transmission gear is connected to an end of the second hot press roller and sheathed around the second hot press transmission shaft such that the second transmission gear is synchronously rotated with the second hot press transmission shaft. The second transmission gear is engaged with the first transmission gear such that the second hot press roller and the first hot press roller are rotated in opposite directions.

In an embodiment, the hot press roller module further includes a hot press connecting gear, a third hot press roller, a third transmission gear, a third hot press transmission shaft, a fourth hot press roller, a fourth hot press transmission shaft and a fourth transmission gear. The hot press connecting gear is engaged with the first transmission gear such that the hot press connecting gear is synchronously rotated with the first transmission gear. The third hot press roller is parallel with the first hot press roller. The third transmission gear is connected to an end of the first hot press roller. The third transmission gear is engaged with the hot press connecting gear such that the third transmission gear is synchronously rotated with the hot press connecting gear. The third hot press transmission shaft is sheathed by the third transmission gear and the third hot press roller such that the third hot press transmission shaft is synchronously rotated with the third transmission gear. The fourth hot press roller is parallel with the third hot press roller. The fourth hot press transmission shaft is sheathed by the fourth hot press roller. The fourth transmission gear is connected to an end of the fourth hot press roller and sheathed around the fourth hot press transmission shaft such that the fourth transmission gear is synchronously rotated with the fourth hot press transmission shaft. The fourth transmission gear is engaged with the third transmission gear such that the fourth hot press roller and the third hot press roller are rotated in opposite directions.

In an embodiment, a power gear is connected to the bottom circular surface of the power input transmission wheel and sheathed around the power transmission shaft such that the power transmission shaft is synchronously rotated with the power gear. The power gear is disposed at a first side of a connecting gear and engaged with the connecting gear. A second power gear is disposed at a second side of the connecting gear and engaged with the connecting gear. The second power gear is connected with the motor.

In an embodiment, the motor is operated at a high rotating speed.

In accordance with another aspect of the present invention, there is provided a continuously variable speed-changing transmission mechanism of a sheet laminating apparatus for driving rotation of a hot press roller module of the sheet laminating apparatus at a variable rotating speed. The continuously variable speed-changing transmission mechanism includes a first conical wheel, a second conical wheel, a first control shaft, a first rod set, a controlling source and a speed reducing module. The first conical wheel and the second conical wheel are sheathed around a rotating shaft and spaced from each other. The first conical wheel is fixedly connected to the rotating shaft. The second conical wheel is pivotally connected to the rotating shaft. The first conical wheel and the second conical wheel have respective smaller-area top circular surfaces and respective larger-area bottom circular surfaces. The top circular surfaces of the first conical wheel and the second conical wheel face to each other. Both sides of the first friction wheel are simultaneously sustained against conical sidewalls of the first conical wheel and the second conical wheel, so that the first friction wheel is synchronously rotated with the first conical wheel and the second conical wheel. The first rod set has a first end connected to a middle portion of the first friction wheel and a second end connected to a first end of the first control shaft, so that the first rod set is vertically connected to the first friction wheel and the first control shaft. The controlling source is connected to the first control shaft for driving the first control shaft such that the first friction wheel is swung along a first arc-shaped trajectory with an axle center of the first control shaft serving as a center point and the length of the first rod set serving as a radius. A contact area between the first friction wheel and the first and second conical wheels is changeable by adjusting a swing angle of the first friction wheel, so that a rotating speed difference between the rotating speed of the first conical wheel and the rotating speed of the second conical wheel is generated. The speed reducing module has both ends respectively connected to the hot press roller module and the second conical wheel, so that the hot press roller module is rotated at a rotating speed lower than the second conical wheel.

In an embodiment, the rotating shaft is a power transmission shaft connected to a motor. Due to a friction force between the first friction wheel and the first conical wheel that is fixedly connected to the power transmission shaft, the first friction wheel is synchronously rotated with the first conical wheel. Due to a friction force between the first friction wheel and the second conical wheel that is pivotally connected to the power transmission shaft, the second conical wheel is synchronously rotated with the first friction wheel.

In an embodiment, a power gear is connected to the bottom circular surface of the first conical wheel and sheathed around the power transmission shaft such that the power transmission shaft is synchronously rotated with the power gear. The power gear is disposed at a first side of a connecting gear and engaged with the connecting gear. A second power gear is disposed at a second side of the connecting gear and engaged with the connecting gear. The second power gear is connected with the motor.

Preferably, the first conical wheel and the second conical wheel are made of soft rubbery material.

In an embodiment, the first conical wheel and the second conical wheel are rotated in opposite directions. The first conical wheel and the second conical wheel are rotated at the same rotating speed if the contact area between the first friction wheel and the first conical wheel is equal to the contact area between the first friction wheel and the second conical wheel. The first conical wheel and the second conical wheel are rotated at different rotating speeds if the contact area between the first friction wheel and the first conical wheel is different from the contact area between the first friction wheel and the second conical wheel.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 2A, 2B and 2C are schematic perspective views illustrating the speed changing module of the continuously variable speed-changing transmission mechanism in different operating situations;

DETAILED DESCRIPTION OF THE PREFERRED EMBODIMENT

Figure 1:
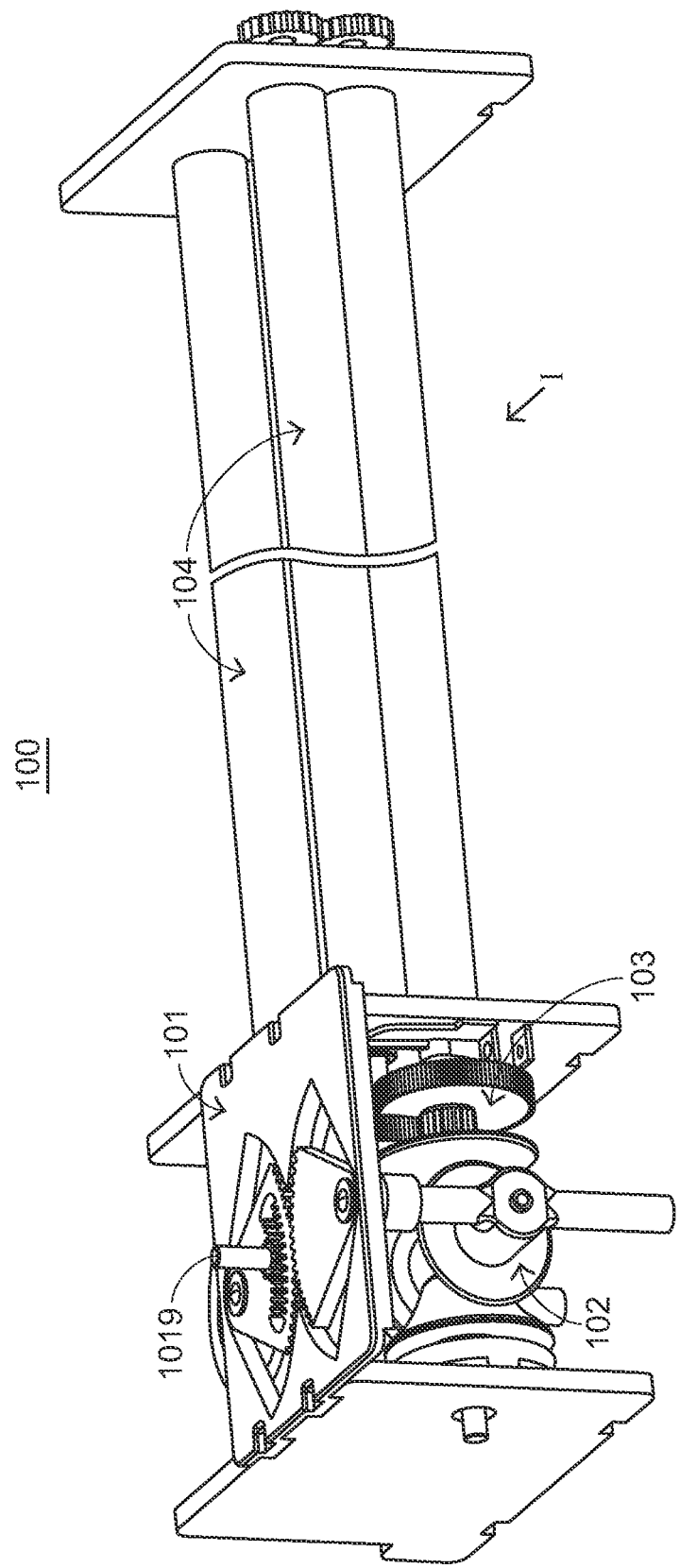
FIG. 1 is a schematic perspective view illustrating a sheet laminating apparatus having a continuously variable speed-changing transmission mechanism according to an embodiment of the present invention.

FIG. 1 is a schematic perspective view illustrating a sheet laminating apparatus having a continuously variable speed-changing transmission mechanism according to an embodiment of the present invention. As shown in FIG. 1, the sheet laminating apparatus 100 principally comprises a control module 101, a speed changing module 102, a speed reducing module 103, and hot press roller module 104. A document (e.g. a sheet article) intervening between an upper thermoplastic film and a lower thermoplastic film is fed into the entrance of the sheet laminating apparatus 100 in the direction indicated as the arrow "I". For laminating the sheet articles of various thicknesses, a controlling operation is performed by a controlling source that is connected to a shift lever 1019 of the control module 101 and a linking operation is performed by the speed changing module 102 and the speed reducing module 103. As a consequence, the hot press roller module 104 is rotated at a proper rotating speed while hot laminating the sheet article.

Figure 2A:
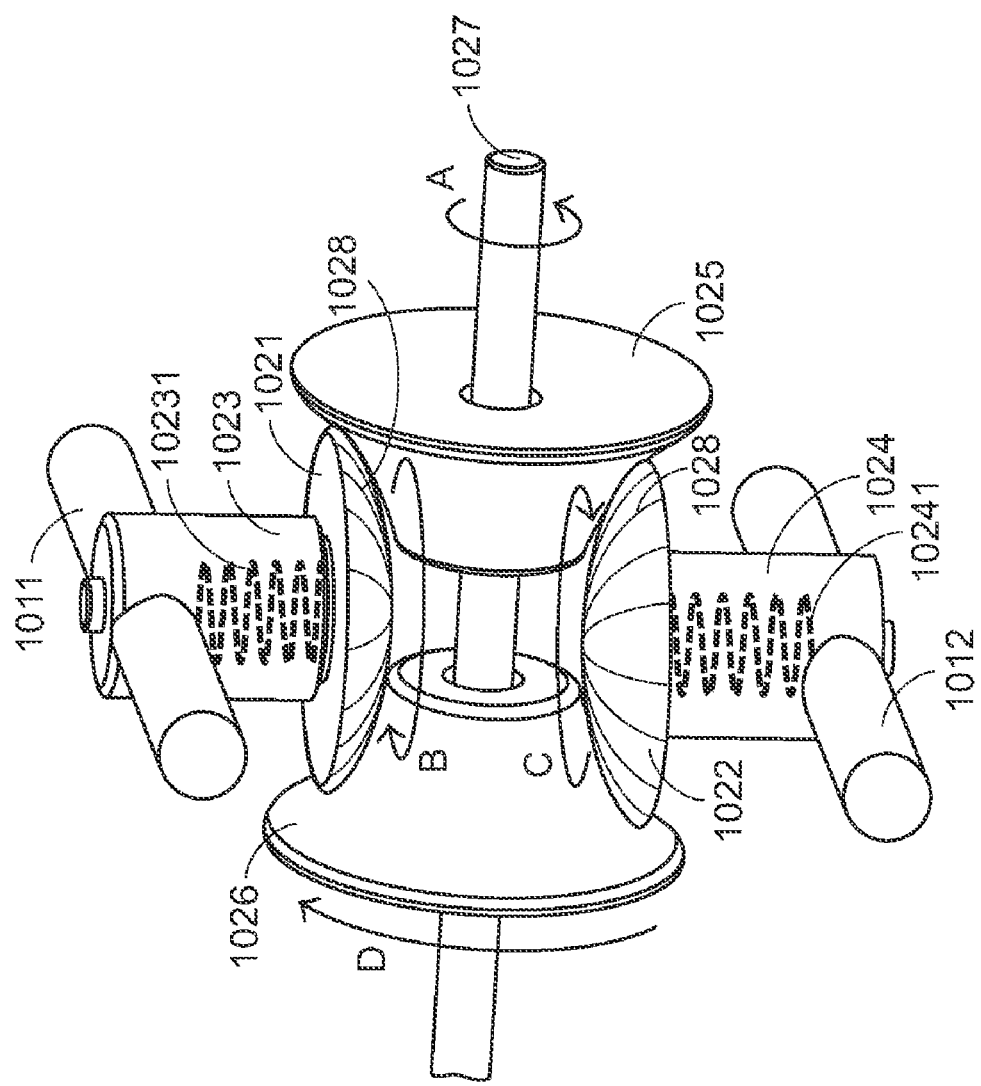

FIGS. 2A, 2B and 2C are schematic perspective views illustrating the speed changing module of the continuously variable speed-changing transmission mechanism in different operating situations. As shown in FIG. 2A, the speed changing module 102 includes a first friction wheel 1021, a second friction wheel 1022, a first rod set 1023, a second rod set 1024, a power input transmission wheel 1025, and a power output transmission wheel 1026.

A first end of the first rod set 1023 is connected to the middle portion of the first friction wheel 1021. A first end of the second rod set 1024 is connected to the middle portion of the second friction wheel 1022. In particular, the friction wheels 1021 and 1022 are vertically connected to the first ends of the rod sets 1023 and 1024, respectively. The second ends of the rod sets 1023 and 1024 are respectively connected to a first control shaft 1011 and a second control shaft 1012 of the control module 101. In particular, the rod sets 1023 and 1024 are vertically connected to the control shafts 1011 and 1012, respectively.

The power input transmission wheel 1025 and the power output transmission wheel 1026 are sheathed around a power transmission shaft 1027, and spaced from each other. In particular, the power input transmission wheel 1025 is fixedly connected to the power transmission shaft 1027 but the power output transmission wheel 1026 is pivotally connected to the power transmission shaft 1027. In this embodiment, the power input transmission wheel 1025 and the power output transmission wheel 1026 are conical wheels. The conical wheel has a top circular surface and a bottom circular surface, wherein the area of the top circular surface is smaller than that of the bottom circular surface. The top circular surfaces of the power input transmission wheel 1025 and the power output transmission wheel 1026 face to each other such that the first friction wheel 1021 and the second friction wheel 1022 are simultaneously sustained against the conical sidewalls of the power input transmission wheel 1025 and the power output transmission wheel 1026.

When the power transmission shaft 1027 is rotated in the direction A, the power input transmission wheel 1025 fixedly connected to the power transmission shaft 1027 is synchronously rotated in the direction A. Due to the friction force between the first friction wheel 1021 and the power input transmission wheel 1025, the first friction wheel 1021 is rotated in the direction B. Similarly, due to the friction force between the second friction wheel 1022 and the power input transmission wheel 1025, the second friction wheel 1022 is rotated in the direction C. Due to the friction forces between the friction wheels 1021, 1022 and the power output transmission wheel 1026, the power output transmission wheel 1026 that is pivotally connected to the power transmission shaft 1027 is rotated in the direction D. The direction D is opposed to the direction A. It is noted that, however, those skilled in the art will readily observe that numerous modifications and alterations may be made while retaining the teachings of the invention. For example, the power transmission shaft 1027 may be rotated in a direction opposite to the direction A. Under this circumstance, the power transmission shaft 1027, the first friction wheel 1021, the second friction wheel 1022 and the power output transmission wheel 1026 are rotated in the directions opposite to the directions A, B, C and D, respectively.

It is preferred that the power input transmission wheel 1025 and the power output transmission wheel 1026 are made of soft rubbery material in order to offer a large friction coefficient. In comparison with the metallic transmission wheels, the range of the transmitting speed of the system may be controlled at a lower level. In other words, when the power input transmission wheel 1025 is made of soft rubbery material, the power input transmission wheel 1025 may be rotated at a low speed without causing a stall speed and sliding. In this embodiment, the first friction wheel 1021 and the second friction wheel 1022 are made of plastic material. In addition, the first friction wheel 1021 and the second friction wheel 1022 have friction strips 1028 for facilitating the frictional stability and efficiency.

Moreover, a first elastomeric element 10231 and a second elastomeric element 10241 are disposed within the first rod set 1023 and the second rod set 1024 for providing normal forces on the first friction wheel 1021 and the second friction wheel 1022. As a consequence, the first friction wheel 1021 and the second friction wheel 1022 are elastically sustained against the conical sidewalls of the power input transmission wheel 1025 and the power output transmission wheel 1026. If the first friction wheel 1021 and the second friction wheel 1022 are abraded, the first elastomeric element 10231 and a second elastomeric element 10241 may provide elastic pressures to achieve a wear loss compensation purpose.

When the first control shaft 1011 and a second control shaft 1012 of the control module 101 are rotated, the first friction wheel 1021 and the second friction wheel 1022 are swung along arc-shaped trajectories, wherein the axle centers of the first control shaft 1011 and the second control shaft 1012 are served as the center points and the lengths of the first rod set 1023 and the second rod set 1024 are served as the radiuses. By the arc-shaped swinging action, the contact areas between the friction wheels 1021, 1022 and the transmission wheels 1025, 1026 are adjustable, thereby controlling the speed change.

In the situation of FIG. 2A, since the contact area between the friction wheels 1021, 1022 and the power input transmission wheel 1025 is equal to the contact area between the friction wheels 1021, 1022 and the power output transmission wheel 1026, the power input transmission wheel 1025 and the power output transmission wheel 1026 are rotated at the same rotating speed.

In the situation of FIG. 2B, the first control shaft 1011 is rotated in the direction E and the second control shaft 1012 is rotated in the direction F. Under this circumstance, since the contact area between the friction wheels 1021, 1022 and the power input transmission wheel 1025 is smaller than the contact area between the friction wheels 1021, 1022 and the power output transmission wheel 1026, the rotating speed of the power output transmission wheel 1026 is smaller than that of the power input transmission wheel 1025. As the rotation amounts of the first control shaft 1011 and the second control shaft 1012 are increased, the contact area between the friction wheels 1021, 1022 and the power input transmission wheel 1025 is more distinguishable from the contact area between the friction wheels 1021, 1022 and the power output transmission wheel 1026. In other words, the rotating speed of the power output transmission wheel 1026 is reduced as the rotation amounts of the first control shaft 1011 and the second control shaft 1012 are increased.

In the situation of FIG. 2C, the first control shaft 1011 is rotated in the direction G and the second control shaft 1012 is rotated in the direction H. Under this circumstance, since the contact area between the friction wheels 1021, 1022 and the power input transmission wheel 1025 is larger than the contact area between the friction wheels 1021, 1022 and the power output transmission wheel 1026, the rotating speed of the power output transmission wheel 1026 is larger than that of the power input transmission wheel 1025. As the rotation amounts of the first control shaft 1011 and the second control shaft 1012 are increased, the contact area between the friction wheels 1021, 1022 and the power input transmission wheel 1025 is more distinguishable from the contact area between the friction wheels 1021, 1022 and the power output transmission wheel 1026. In other words, the rotating speed of the power output transmission wheel 1026 is increased as the rotation amounts of the first control shaft 1011 and the second control shaft 1012 are increased.

Figure 3:
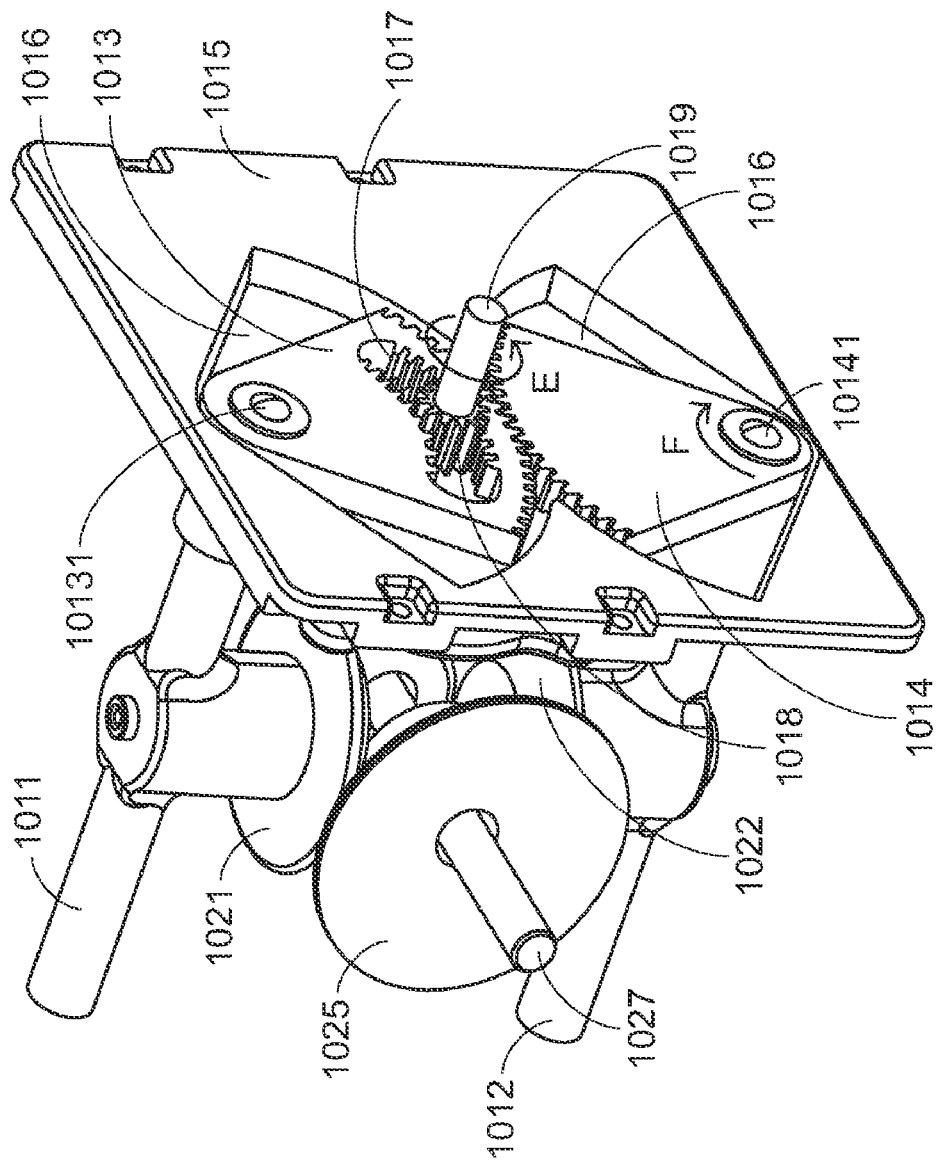
FIG. 3 is a schematic perspective view illustrating the control module of the continuously variable speed-changing transmission mechanism according to an embodiment of the present invention.

FIG. 3 is a schematic perspective view illustrating the control module of the continuously variable speed-changing transmission mechanism according to an embodiment of the present invention. The control module 101 includes a first sector element 1013, a second sector element 1014, a plate-type frame 1015, and a shift lever 1019.

The plate-type frame 1015 has a receptacle 1016 for accommodating the first sector element 1013 and the second sector element 1014 when the first sector element 1013 and the second sector element 1014 are swung along arc-shaped trajectories. The arc-shaped edges of the first sector element 1013 and the second sector element 1014 have teeth structures, which are engaged with each other. The sectorial centers 10131 and 10141 of the first sector element 1013 and the second sector element 1014 are respectively connected to the first control shaft 1011 and the second control shaft 1012. In other words, the first sector element 1013 and the second sector element 1014 are vertically connected to the first control shaft 1011 and the second control shaft 1012, respectively.

The first sector element 1013 has an arc-shaped recess. The arc-shaped recess has a ratchet structure 1017 formed on the inner wall thereof. An end of the shift lever 1019 has a connecting ratchet 1018, which is engaged with the ratchet structure 1017 of the arc-shaped recess. In a case that the shift lever 1019 is driven by the controlling source to be rotated in the direction E (see also FIG. 2B), the first sector element 1013 is swung along the arc-shaped trajectory with respect to the first sectorial center 10131 (or the axle center of the first control shaft 1011) because the ratchet structure 1017 is driven by the connecting ratchet 1018 to moved along the arc-shaped trajectory. As such, the first control shaft 1011 is synchronously rotated in the direction E. Similarly, since the teeth structures of the first sector element 1013 and the second sector element 1014 are engaged with each other, the second sector element 1014 is swung along the arc-shaped trajectory with respect to the second sectorial center 10141 in the direction F (see also FIG. 2B). As such, the second control shaft 1012 is synchronously rotated in the direction F.

Figure 4:
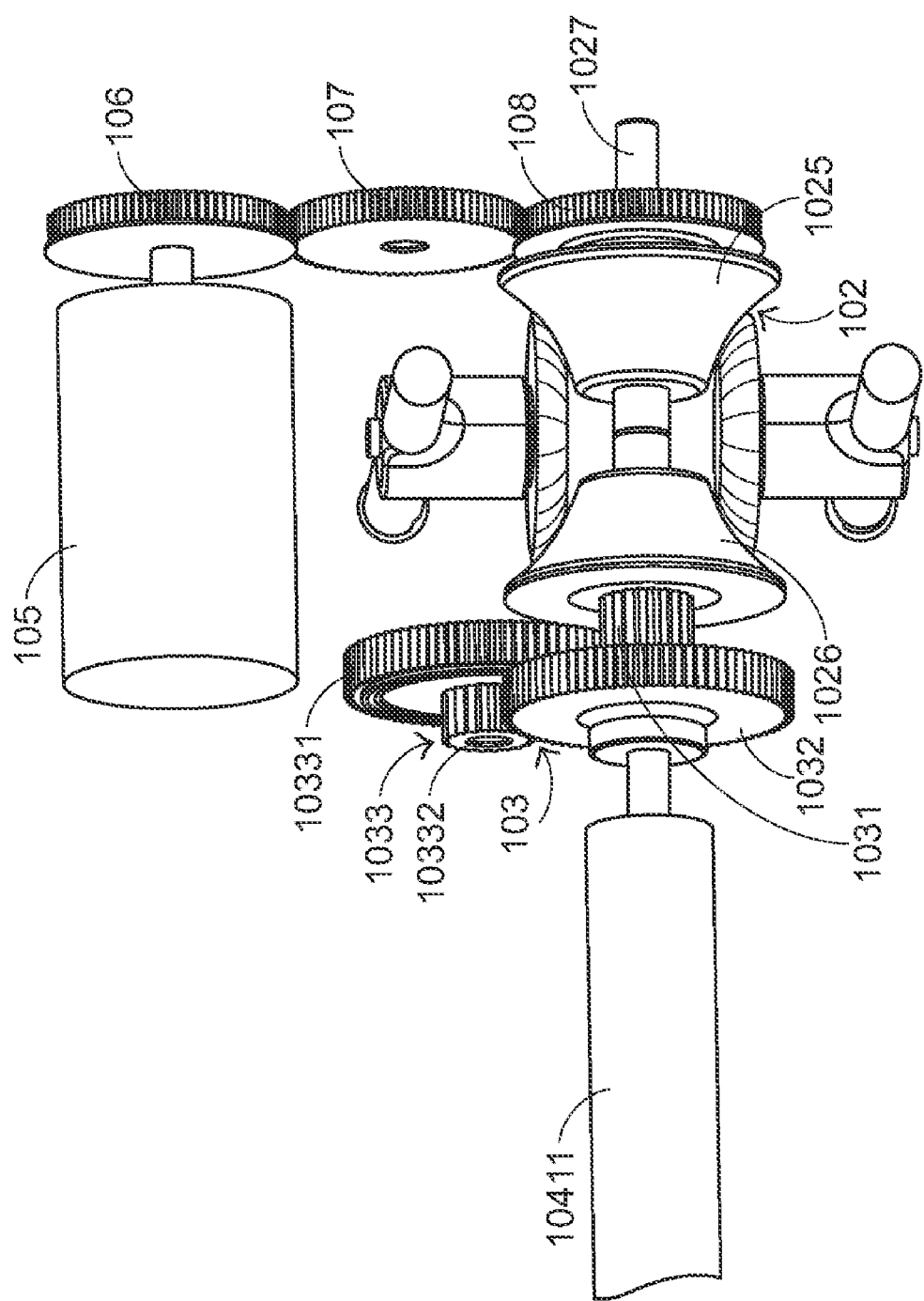
FIG. 4 is a schematic perspective view illustrating the parts of the continuously variable speed-changing transmission mechanism according to an embodiment of the present invention.

FIG. 4 is a schematic perspective view illustrating the parts of the continuously variable speed-changing transmission mechanism according to an embodiment of the present invention. As shown in FIG. 4, the speed reducing module 103 is arranged between a first hot press roller 10411 and the power output transmission wheel 1026. The speed reducing module 103 includes a power output gear 1031, a hot press gear 1032 and a combining gear set 1033. The power output gear 1031 is connected to the bottom circular surface of the power output transmission wheel 1026. The hot press gear 1032 is connected to the first hot press roller 10411. The tooth number of the hot press gear 1032 is greater than the tooth number of the power output gear 1031. The combining gear set 1033 includes a first-layered gear 10331 and a second-layered gear 10332. The first-layered gear 10331 and the second-layered gear 10332 are integrally formed, so that the first-layered gear 10331 and the second-layered gear 10332 are synchronously rotated. The tooth number of the first-layered gear 10331 is greater than the tooth number of the second-layered gear 10332. The power output gear 1031 is engaged with the first-layered gear 10331. The second-layered gear 10332 is engaged with the hot press gear 1032. As a consequence, when the first-layered gear 10331 is driven by the power output gear 1031 to rotate, the second-layered gear 10332 and the hot press gear 1032 are synchronously rotated.

Since the tooth number of the hot press gear 1032 is greater than the tooth number of the power output gear 1031 and the tooth number of the first-layered gear 10331 is greater than the tooth number of the second-layered gear 10332, the rotating speed of the hot press gear 1032 is smaller than the rotating speed of the power output gear 1031. From the above description, when a tiny rotation torque is applied on the speed changing module 102, the rotation torque is amplified by the speed reducing module 103. As a consequence, the friction loss of the speed changing module 102 is reduced.

In this embodiment, the motive power source of the power transmission shaft 1027 is a motor 105 that is operated at a high rotating speed. For reducing the overall volume of the sheet laminating apparatus, the motor 105 is not directly connected with the power transmission shaft 1027. Via a power gear 108, a connecting gear 107 and another power gear 106, the motor 105 is indirectly connected to the power transmission shaft 1027. The power gear 108 is arranged on the bottom circular surface of the power input transmission wheel 1025 and sheathed around the power transmission shaft 1027. The power gear 108 is disposed at a first side of the connecting gear 107 and engaged with the connecting gear 107. The power gear 106 is disposed at a second side of the connecting gear 107 and engaged with the connecting gear 107. The power gear 106 is connected with the motor 105. When the motor 105 is rotated, the power gear 108 is driven to rotate and thus the power transmission shaft 1027 is synchronously rotated.

As mentioned above, the speed changing module 102 is driven and controlled by means of friction forces. Since the motor 105 is operated at a high rotating speed, the high speed cause the power transmission shaft 1027 is rotate at a high rotating speed to overcome the static friction force. As a consequence, the possibility of resulting in the stall speed or sliding problem from inhomogeneity will be minimized and the system stability will be enhanced. On the other hand, since the laminating process needs not to be operated at a high rotating speed, the use of the speed reducing module 103 may facilitate reducing the hot press speed.

Figure 5:
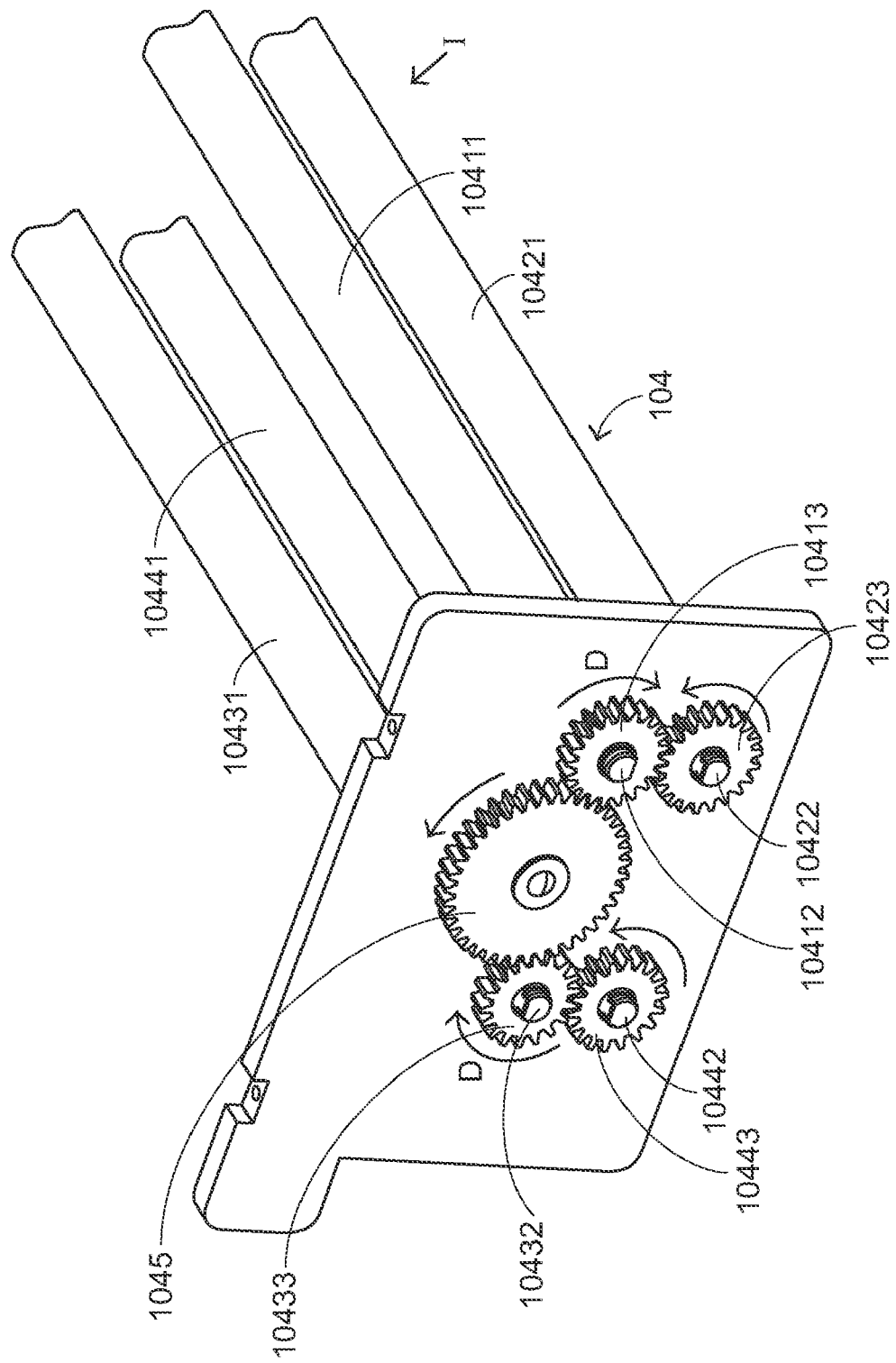
FIG. 5 is a schematic perspective view illustrating the hot press roller module of the continuously variable speed-changing transmission mechanism according to an embodiment of the present invention.

FIG. 5 is a schematic perspective view illustrating the hot press roller module of the continuously variable speed-changing transmission mechanism according to an embodiment of the present invention. The hot press roller module 104 comprises a first hot press roller 10411, a first hot press transmission shaft 10412, a first transmission gear 10413, a second hot press roller 10421, a second hot press transmission shaft 10422 and a second transmission gear 10423. An end of the first hot press roller 10411 is connected to the hot press gear 1032 (as shown in FIG. 4). The first hot press transmission shaft 10412 is sheathed by the hot press gear 1032 and the first hot press roller 10411. As such, the first hot press transmission shaft 10412 is synchronously rotated with the hot press gear 1032. A second end of the first hot press roller 10411 is connected to the first transmission gear 10413 and the first hot press transmission shaft 10412 is also sheathed by the first transmission gear 10413. As such, the first transmission gear 10413 is synchronously rotated with the first hot press transmission shaft 10412. Moreover, the second hot press roller 10421 is parallel with the first hot press roller 10411 and sheathed around the second hot press transmission shaft 10422. An end of the second hot press roller 10421 is connected to the second transmission gear 10423. The second hot press transmission shaft 10422 is also sheathed by the second transmission gear 10423. As such, the second transmission gear 10423 is synchronously rotated with the second hot press transmission shaft 10422. Since the second transmission gear 10423 is engaged with the first transmission gear 10413, the second hot press roller 10421 and the first hot press roller 10411 are rotated in opposite directions.

For enhancing the laminating efficacy, the hot press roller module 104 further comprises a third hot press roller 10431, a third hot press transmission shaft 10432, a third transmission gear 10433, a fourth hot press roller 10441, a fourth hot press transmission shaft 10442, a fourth transmission gear 10443 and a hot press connecting gear 1045. The third hot press roller 10431 is parallel with the first hot press roller 10411. An end of the third hot press roller 10431 is connected to the third transmission gear 10433. The third hot press transmission shaft 10432 is sheathed by the third transmission gear 10433 and the third hot press roller 10431. As such, the hot press transmission shaft 10432 is synchronously rotated with the third transmission gear 10433. The fourth hot press roller 10441 is parallel with the third hot press roller 10431. An end of the fourth hot press roller 10441 is connected to the fourth transmission gear 10443. The fourth hot press transmission shaft 10442 is sheathed by the fourth transmission gear 10443 and the fourth hot press roller 10441. As such, the fourth hot press transmission shaft 10442 is synchronously rotated with the fourth transmission gear 10443. Since the fourth transmission gear 10443 is engaged with the third transmission gear 10433, the fourth hot press roller 10441 and the third hot press roller 10431 are rotated in opposite directions.

The first transmission gear 10413 and the third transmission gear 10433 are respectively engaged with both sides of the hot press connecting gear 1045. As such, the first hot press roller 10411 and the third hot press roller 10431 are rotated in the same direction, and the second hot press roller 10421 and the fourth hot press roller 10441 are rotated in the same direction.

In an implementing example, a sheet article (e.g. a document) intervening between an upper thermoplastic film and a lower thermoplastic film is fed into the entrance of the sheet laminating apparatus 100 in the direction indicated as the arrow "I" (see also FIG. 1). During the laminating process, the first hot press roller 10411 and the third hot press roller 10431 are rotated in the direction D (see also FIG. 2A); but the second hot press roller 10421, the fourth hot press roller 10441 and the hot press connecting gear 1045 are rotated in a direction opposite to the direction D.

In the above embodiments, the continuously variable speed-changing transmission mechanism of the sheet laminating apparatus according to the present invention is illustrated by using two friction wheels to achieve the speed changing purpose. Nevertheless, the concept of the present invention can be applied to a single friction wheel.

In the above embodiments, the power input transmission wheel is driven by the power transmission shaft, and the power output transmission wheel is driven by the first friction wheel and the second friction wheel. It is noted that, however, those skilled in the art will readily observe that numerous modifications and alterations may be made while retaining the teachings of the invention. For example, the power input transmission wheel and the power output transmission wheel may be driven by the first friction wheel or the second friction wheel in order to achieve the speed changing purpose.

From the above description, by using the continuously variable speed-changing transmission mechanism of the present invention, the sheet laminating apparatus can be operated at different rotating speeds and at the same temperature in order to laminate the sheet articles of various thicknesses. Moreover, the time period of reaching the proper laminating temperature is reduced. The continuously variable speed-changing transmission mechanism of the present invention is operated according to mechanical theories. Since no additional electronic controller is required to control the rotating speed of the motor, the sheet laminating apparatus of the present invention is more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A continuously variable speed-changing transmission mechanism of a sheet laminating apparatus for driving rotation of a hot press roller module of said sheet laminating apparatus at a variable rotating speed, said continuously variable speed -changing transmission mechanism comprising:

a speed changing module comprising a friction wheel, a power input transmission wheel and a power output transmission wheel, wherein a first end of a rod set is connected to a middle portion of said friction wheel such that said friction wheel is vertically connected to said rod set, said power input transmission wheel and said power output transmission wheel are sheathed around a power transmission shaft and spaced from each other, said power input transmission wheel is fixedly connected to said power transmission shaft, said power output transmission wheel is pivotally connected to said power transmission shaft, said power input transmission wheel and said power output transmission wheel are conical wheels having respective smaller-area top circular surfaces and respective larger-area bottom circular surfaces, and said top circular surfaces of said power input transmission wheel and the power output transmission wheel face to each other such that both sides of said friction wheel are simultaneously sustained against conical sidewalls of said conical wheels, wherein said speed changing module further includes a second friction wheel, a first end of a second rod set is connected to a middle portion of said second friction wheel such that said second friction wheel is vertically connected to said second rod set, and both sides of said second friction wheel are simultaneously sustained against conical sidewalls of said conical wheels such that said second friction wheel is swung along a second arc-shaped trajectory;

a control module having a controlling source and connected to said rod set for driving said rod set and swinging said friction wheel along an arc-shaped trajectory, wherein a contact area between said friction wheel and said power input transmission wheel and said power output transmission wheel is changeable by adjusting a swing angle of said friction wheel, wherein said control module further includes:

a control shaft, a first end of said control shaft is connected to a second end of said rod set such that said control shaft is vertically connected to said rod set, and when said control shaft is driven by said controlling source, said friction wheel is swung along said arc-shaped trajectory with an axle center of said control shaft serving as a center point and the length of said rod set serving as a radius;

a sector element having a sectorial center, wherein said sectorial center is connected a second end of said control shaft such that said sector element is vertically connected to said control shaft;

an arc-shaped recess formed in said sector element and having a ratchet structure on an inner wall thereof;

a shift lever having a first end connected to said controlling source, wherein a connecting ratchet is formed on a second end of said shift lever and engaged with said ratchet structure of said arc-shaped recess, wherein when said shift lever is driven by said controlling source, said ratchet structure is driven by said connecting ratchet, so that said sector element is swung along said arc-shaped trajectory with respect to said axle center of said control shaft and said control shaft is synchronously rotated along said arc-shaped trajectory;

a second control shaft, wherein a first end of said second control shaft is connected to a second end of said second rod set such that said second control shaft is vertically connected to said second rod set; and a second sector element having a second sectorial center, wherein said second sectorial center is connected a second end of said second control shaft such that said second sector element is vertically connected to said second control shaft, wherein arc-shaped edges of said sector element and said second sector element have teeth structures engaged with each other, so that said sector element is swung along a second arc-shaped trajectory with respect to an axle center of said second control shaft, and said second friction wheel is swung along said second arc-shaped trajectory with said axle center of said second control shaft serving as a center point and the length of said second rod set serving as a radius;

a motor connected to said power transmission shaft for driving said power transmission shaft, wherein due to a friction force between said friction wheel and said power input transmission wheel that is fixedly connected to said power transmission shaft, said friction wheel is synchronously rotated with said power input transmission wheel, and due to a friction force between said friction wheel and said power output transmission wheel that is pivotally connected to said power transmission shaft, said power output transmission wheel is synchronously rotated with said friction wheel; and a speed reducing module having both ends respectively connected to said hot press roller module and said power output transmission wheel, so that said hot press roller module is rotated at a rotating speed lower than said power output transmission wheel.

2. The continuously variable speed-changing transmission mechanism according to claim 1 wherein said friction wheel is made of plastic material and having friction strips.

3. The continuously variable speed-changing transmission mechanism according to claim 1 wherein an elastomeric element is disposed within said rod set for providing a normal force on said friction wheel, so that said friction wheel is elastically sustained against said conical sidewalls of said conical wheels.

4. The continuously variable speed-changing transmission mechanism according to claim 1 wherein said power input transmission wheel and said power output transmission wheel are made of soft rubbery materials.

5. The continuously variable speed-changing transmission mechanism according to claim 1 wherein said power output transmission wheel and said power input transmission wheel are rotated in opposite directions, said power input transmission wheel and said power output transmission wheel are rotated at the same rotating speed if the contact area between said friction wheel and said power input transmission wheel is equal to the contact area between said friction wheel and said power output transmission wheel, and said power input transmission wheel and said power output transmission wheel are rotated at different rotating speeds if the contact area between said friction wheel and said power input transmission wheel is different from the contact area between said friction wheel and said power output transmission wheel.

6. The continuously variable speed-changing transmission mechanism according to claim 1 wherein said second friction wheel is made of plastic material and having friction strips.

7. The continuously variable speed-changing transmission mechanism according to claim 1 wherein a second elastomeric element is disposed within said second rod set for providing a normal force on said second friction wheel, so that said second friction wheel is elastically sustained against said conical sidewalls of said conical wheels.

8. The continuously variable speed-changing transmission mechanism according to claim 1 wherein said control module further includes a plate-type frame having a receptacle for accommodating said sector element swung along said arc-shaped trajectory and said second sector element swung along said second arc-shaped trajectory.

9. A continuously variable speed-changing transmission mechanism of a sheet laminating apparatus for driving rotation of a hot press roller module of said sheet laminating apparatus at a variable rotating speed, said continuously variable speed-changing transmission mechanism comprising:

a speed changing module comprising a friction wheel, a power input transmission wheel and a power output transmission wheel, wherein a first end of a rod set is connected to a middle portion of said friction wheel such that said friction wheel is vertically connected to said rod set, said power input transmission wheel and said power output transmission wheel are sheathed around a power transmission shaft and spaced from each other, said power input transmission wheel is fixedly connected to said power transmission shaft, said power output transmission wheel is pivotally connected to said power transmission shaft, said power input transmission wheel and said power output transmission wheel are conical wheels having respective smaller-area top circular surfaces and respective larger-area bottom circular surfaces, and said top circular surfaces of said power input transmission wheel and the power output transmission wheel face to each other such that both sides of said friction wheel are simultaneously sustained against conical sidewalls of said conical wheels;

a control module having a controlling source and connected to said rod set for driving said rod set and swinging said friction wheel along an arc-shaped trajectory, wherein a contact area between said friction wheel and said power input transmission wheel and said power output transmission wheel is changeable by adjusting a swing angle of said friction wheel;

a motor connected to said power transmission shaft for driving said power transmission shaft, wherein due to a friction force between said friction wheel and said power input transmission wheel that is fixedly connected to said power transmission shaft, said friction wheel is synchronously rotated with said power input transmission wheel, and due to a friction force between said friction wheel and said power output transmission wheel that is pivotally connected to said power transmission shaft, said power output transmission wheel is synchronously rotated with said friction wheel; and a speed reducing module having both ends respectively connected to said hot press roller module and said power output transmission wheel, so that said hot press roller module is rotated at a rotating speed lower than said power output transmission wheel, wherein said speed reducing module includes:

a power output gear connected to said bottom circular surface of said power output transmission wheel;

a hot press gear connected to said hot press roller module, wherein the tooth number of said hot press gear is greater than the tooth number of said power output gear; and a combining gear set including a first-layered gear and a second-layered gear, which are synchronously rotated, wherein the tooth number of said first-layered gear is greater than the tooth number of said second-layered gear, said power output gear is engaged with said first-layered gear, and said second-layered gear is engaged with said hot press gear, wherein when said first-layered gear is driven by said power output gear to rotate, said second-layered gear and said hot press gear are synchronously rotated.

10. The continuously variable speed-changing transmission mechanism according to claim 9 wherein said first-layered gear and said second-layered gear of said combining gear set are integrally formed.

11. The continuously variable speed-changing transmission mechanism according to claim 9 wherein said hot press roller module includes:
a first hot press roller having a first end connected to said connected to said hot press gear;
a first hot press transmission shaft sheathed by said hot press gear and said first hot press roller such that said first hot press transmission shaft is synchronously rotated with said hot press gear;
a first transmission gear connected to a second end of said first hot press roller, wherein said first hot press transmission shaft is sheathed by said first transmission gear such that said first transmission gear is synchronously rotated with said first hot press transmission shaft;
a second hot press roller parallel with the first hot press roller;
a second hot press transmission shaft sheathed by said second hot press roller; and
a second transmission gear connected to an end of said second hot press roller and sheathed around said second hot press transmission shaft such that said second transmission gear is synchronously rotated with said second hot press transmission shaft, wherein said second transmission gear is engaged with said first transmission gear such that said second hot press roller and said first hot press roller are rotated in opposite directions.

12. The continuously variable speed-changing transmission mechanism according to claim 11 wherein said hot press roller module further includes:
a hot press connecting gear engaged with said first transmission gear, so that said hot press connecting gear is synchronously rotated with said first transmission gear;
a third hot press roller parallel with said first hot press roller;
a third transmission gear connected to an end of said first hot press roller, wherein said third transmission gear is engaged with said hot press connecting gear such that said third transmission gear is synchronously rotated with said hot press connecting gear;
a third hot press transmission shaft sheathed by said third transmission gear and said third hot press roller such that said third hot press transmission shaft is synchronously rotated with said third transmission gear;
a fourth hot press roller parallel with said third hot press roller;
a fourth hot press transmission shaft sheathed by said fourth hot press roller; and
a fourth transmission gear connected to an end of said fourth hot press roller and sheathed around said fourth hot press transmission shaft such that said fourth transmission gear is synchronously rotated with said fourth hot press transmission shaft, wherein said fourth transmission gear is engaged with said third transmission gear such that said fourth hot press roller and said third hot press roller are rotated in opposite directions.

13. The continuously variable speed-changing transmission mechanism according to claim 1 wherein a power gear is connected to said bottom circular surface of said power input transmission wheel and sheathed around said power transmission shaft such that said power transmission shaft is synchronously rotated with said power gear, wherein said power gear is disposed at a first side of a connecting gear and engaged with said connecting gear, a second power gear is disposed at a second side of said connecting gear and engaged with said connecting gear, and said second power gear is connected with said motor.

14. A continuously variable speed-changing transmission mechanism of a sheet laminating apparatus for driving rotation of a hot press roller module of said sheet laminating apparatus at a variable rotating speed, said continuously variable speed-changing transmission mechanism comprising:
a first conical wheel and a second conical wheel sheathed around a rotating shaft and spaced from each other, wherein said first conical wheel is fixedly connected to said rotating shaft, said second conical wheel is pivotally connected to said rotating shaft, said first conical wheel and said second conical wheel have respective smaller-area top circular surfaces and respective larger-area bottom circular surfaces, and said top circular surfaces of said first conical wheel and said second conical wheel face to each other;
a first control shaft;
a first friction wheel, both sides of which are simultaneously sustained against conical sidewalls of said first conical wheel and said second conical wheel, so that said first friction wheel is synchronously rotated with said first conical wheel and said second conical wheel;
a first rod set having a first end connected to a middle portion of said first friction wheel and a second end connected to a first end of said first control shaft, so that said first rod set is vertically connected to said first friction wheel and said first control shaft;
a controlling source connected to said first control shaft for driving said first control shaft such that said first friction wheel is swung along a first arc-shaped trajectory with an axle center of said first control shaft serving as a center point and the length of said first rod set serving as a radius, wherein a contact area between said first friction wheel and said first and second conical wheels is changeable by adjusting a swing angle of said first friction wheel, so that a rotating speed difference between the rotating speed of said first conical wheel and the rotating speed of said second conical wheel is generated; and
a speed reducing module having both ends respectively connected to said hot press roller module and said second conical wheel, so that said hot press roller module is rotated at a rotating speed lower than said second conical wheel, wherein said speed reducing module includes:
a power output gear connected to said bottom circular surface of said second conical wheel:
a hot press gear connected to said hot press roller module, wherein the tooth number of said hot press gear is greater than the tooth number of said power output gear; and
a combining gear set including a first-layered gear and a second-layered gear, which are synchronously rotated, wherein the tooth number of said first-layered gear is greater than the tooth number of said second-layered gear, said power output gear is engaged with said first-layered gear, and said second-layered gear is engaged with said hot press gear, wherein when said first-layered gear is driven by said power output gear to rotate, said second-layered gear and said hot press gear are synchronously rotated.

15. The continuously variable speed-changing transmission mechanism according to claim 14 wherein said rotating shaft is a power transmission shaft connected to a motor, wherein due to a friction force between said first friction wheel and said first conical wheel that is fixedly connected to said power transmission shaft, said first friction wheel is synchronously rotated with said first conical wheel, and due to a friction force between said first friction wheel and said second conical wheel that is pivotally connected to said power transmission shaft, said second conical wheel is synchronously rotated with said first friction wheel.

16. The continuously variable speed-changing transmission mechanism according to claim 15 wherein a power gear is connected to said bottom circular surface of said first conical wheel and sheathed around said power transmission shaft such that said power transmission shaft is synchronously rotated with said power gear, wherein said power gear is disposed at a first side of a connecting gear and engaged with said connecting gear, a second power gear is disposed at a second side of said connecting gear and engaged with said connecting gear, and said second power gear is connected with said motor.

17. The continuously variable speed-changing transmission mechanism according to claim 15 wherein said motor is operated at a high rotating speed.

18. The continuously variable speed-changing transmission mechanism according to claim 14 wherein said first conical wheel and said second conical wheel are made of soft rubbery material.

19. The continuously variable speed-changing transmission mechanism according to claim 14 wherein said first conical wheel and said second conical wheel are rotated in opposite directions, said first conical wheel and said second conical wheel are rotated at the same rotating speed if the contact area between said first friction wheel and said first conical wheel is equal to the contact area between said first friction wheel and said second conical wheel, and said first conical wheel and said second conical wheel are rotated at different rotating speeds if the contact area between said first friction wheel and said first conical wheel is different from the contact area between said first friction wheel and said second conical wheel.

20. The continuously variable speed-changing transmission mechanism according to claim 14 wherein said first friction wheel is made of plastic material and having friction strips.

21. The continuously variable speed-changing transmission mechanism according to claim 14 wherein a first elastomeric element is disposed within said first rod set for providing a normal force on said first friction wheel, so that said first friction wheel is elastically sustained against said conical sidewalls of said first and second conical wheels.

22. The continuously variable speed-changing transmission mechanism according to claim 14 further comprising a second friction wheel, wherein a middle portion of said second friction wheel is connected to a second rod set such that said second friction wheel is vertically connected to said second rod set, and both sides of said second friction wheel are simultaneously sustained against said conical sidewalls of said first conical wheel and said second conical wheel, so that said second friction wheel is swung with respect to said first friction wheel along a second arc-shaped trajectory.

23. The continuously variable speed-changing transmission mechanism according to claim 22 wherein said second friction wheel is made of plastic material and having friction strips.

24. The continuously variable speed-changing transmission mechanism according to claim 22 wherein a second elastomeric element is disposed within said second rod set for providing a normal force on said second friction wheel, so that said second friction wheel is elastically sustained against said conical sidewalls of said first and second conical wheels.

25. The continuously variable speed-changing transmission mechanism according to claim 22 further comprising:
a first sector element having a first sectorial center, wherein said first sectorial center is connected a second end of said first control shaft such that said first sector element is vertically connected to said first control shaft;
an arc-shaped recess formed in said first sector element and having a ratchet structure on an inner wall thereof; and
a shift lever having a first end connected to said controlling source, wherein a connecting ratchet is formed on a second end of said shift lever and engaged with said ratchet structure of said arc-shaped recess,
wherein when said shift lever is driven by said controlling source, said ratchet structure is driven by said connecting ratchet, so that said first sector element is swung along said first arc-shaped trajectory with respect to said axle center of said first control shaft and said first control shaft is synchronously rotated along said first arc-shaped trajectory.

26. The continuously variable speed-changing transmission mechanism according to claim 25 further comprising:
a second control shaft, wherein a first end of said second control shaft is connected to a second end of said second rod set such that said second control shaft is vertically connected to said second rod set; and
a second sector element having a second sectorial center, wherein said second sectorial center is connected a second end of said second control shaft such that said second sector element is vertically connected to said second control shaft,
wherein arc-shaped edges of said sector element and said second sector element have teeth structures engaged with each other, so that said sector element is swung along a second arc-shaped trajectory with respect to an axle center of said second control shaft, and said second friction wheel is swung along said second arc-shaped trajectory with said axle center of said second control shaft serving as a center point and the length of said second rod set serving as a radius.

27. The continuously variable speed-changing transmission mechanism according to claim 26 wherein said control module further includes a plate-type frame having a receptacle for accommodating said first sector element swung along said first arc-shaped trajectory and said second sector element swung along said second arc-shaped trajectory.

28. The continuously variable speed-changing transmission mechanism according to claim 14 wherein said first-layered gear and said second-layered gear of said combining gear set are integrally formed.

29. The continuously variable speed-changing transmission mechanism according to claim 14 wherein said hot press roller module includes:
a first hot press roller having a first end connected to said connected to said hot press gear;
a first hot press transmission shaft sheathed by said hot press gear and said first hot press roller such that said first hot press transmission shaft is synchronously rotated with said hot press gear;
a first transmission gear connected to a second end of said first hot press roller, wherein said first hot press transmission shaft is sheathed by said first transmission gear such that said first transmission gear is synchronously rotated with said first hot press transmission shaft;
a second hot press roller parallel with the first hot press roller;
a second hot press transmission shaft sheathed by said second hot press roller; and a second transmission gear connected to an end of said second hot press roller and sheathed around said second hot press transmission shaft such that said second transmission gear is synchronously rotated with said second hot press transmission shaft, wherein said second transmission gear is engaged with said first transmission gear such that said second hot press roller and said first hot press roller are rotated in opposite directions.

30. The continuously variable speed-changing transmission mechanism according to claim 29 wherein said hot press roller module further includes:
   a hot press connecting gear engaged with said first transmission gear, so that said hot press connecting gear is synchronously rotated with said first transmission gear;
   a third hot press roller parallel with said first hot press roller;
   a third transmission gear connected to an end of said first hot press roller, wherein said third transmission gear is engaged with said hot press connecting gear such that said third transmission gear is synchronously rotated with said hot press connecting gear;
   a third hot press transmission shaft sheathed by said third transmission gear and said third hot press roller such that said third hot press transmission shaft is synchronously rotated with said third transmission gear;
   a fourth hot press roller parallel with said third hot press roller;
   a fourth hot press transmission shaft sheathed by said fourth hot press roller; and
   a fourth transmission gear connected to an end of said fourth hot press roller and sheathed around said fourth hot press transmission shaft such that said fourth transmission gear is synchronously rotated with said fourth hot press transmission shaft, wherein said fourth transmission gear is engaged with said third transmission gear such that said fourth hot press roller and said third hot press roller are rotated in opposite directions.

* * * * *